(12) United States Patent
Polis et al.

(10) Patent No.: US 6,592,695 B1
(45) Date of Patent: Jul. 15, 2003

(54) BINDER SYSTEM FOR CERAMIC ARC DISCHARGE LAMP

(75) Inventors: Daniel L. Polis, Cleveland Heights, OH (US); David Dudik, North Olmsted, OH (US); Vishal Gauri, Lyndhurst, OH (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 09/714,635

(22) Filed: Nov. 16, 2000

(51) Int. Cl.$^7$ ................................. B32B 31/26
(52) U.S. Cl. ................... 156/89.11; 156/89.23; 264/632; 264/670
(58) Field of Search .............. 156/89.11, 89.23, 156/244.11, 244.13, 245; 264/632, 634, 645, 657, 669, 670

(56) References Cited

U.S. PATENT DOCUMENTS

| | | | |
|---|---|---|---|
| 4,000,110 A | | 12/1976 | Saito et al. |
| 4,144,207 A | | 3/1979 | Ohnsorg |
| 4,235,671 A | | 11/1980 | Barnert et al. |
| 4,237,037 A | | 12/1980 | Takahashi |
| 4,305,756 A | | 12/1981 | Wiech, Jr. |
| 4,404,166 A | | 9/1983 | Wiech, Jr. |
| 4,456,713 A | | 6/1984 | French et al. |
| 4,460,527 A | | 7/1984 | Kato |
| 4,544,327 A | | 10/1985 | Kato |
| 4,551,496 A | | 11/1985 | Renlund et al. |
| 4,568,502 A | | 2/1986 | Theodore et al. |
| 4,571,414 A | | 2/1986 | Renlund et al. |
| 4,579,703 A | | 4/1986 | Adlerborn et al. |
| 4,704,242 A | | 11/1987 | Bandyopadhyay et al. |
| 4,708,838 A | | 11/1987 | Bandyopadhyay et al. |
| 4,797,238 A | * | 1/1989 | Rhodes et al. |
| 4,819,010 A | * | 4/1989 | Kohashi et al. |
| 4,837,187 A | * | 6/1989 | Frank et al. |
| 4,962,148 A | | 10/1990 | Orikasa et al. |
| 5,019,537 A | | 5/1991 | Kato et al. |
| 5,030,397 A | | 7/1991 | Bandyopadhyay et al. |
| 5,086,093 A | | 2/1992 | Miller |
| 5,087,399 A | | 2/1992 | Neil et al. |
| 5,087,594 A | | 2/1992 | Kato et al. |
| 5,159,007 A | | 10/1992 | Saitoh et al. |
| 5,206,087 A | | 4/1993 | Tokiwa et al. |
| 5,254,613 A | | 10/1993 | Bayer et al. |
| 5,266,264 A | | 11/1993 | Miura et al. |
| 5,278,251 A | | 1/1994 | Ohtani et al. |
| 5,284,584 A | * | 2/1994 | Huang et al. |
| 5,326,395 A | | 7/1994 | Aldcroft et al. |
| 5,380,179 A | | 1/1995 | Nishimura et al. |
| 5,417,756 A | | 5/1995 | Bayer et al. |
| 5,602,197 A | | 2/1997 | Johnson et al. |
| 5,611,978 A | | 3/1997 | Truenbach |
| 5,681,799 A | | 10/1997 | Song et al. |

(List continued on next page.)

Primary Examiner—Curtis Mayes
(74) Attorney, Agent, or Firm—Fay, Sharpe, Fagan, Minnich & McKee, LLP

(57) ABSTRACT

A binder system for forming a ceramic body, such as a translucent arc tube for a metal halide lamp, comprises a hydrocarbon, such as a paraffin wax, a copolymer, such as poly (ethylene-co-vinyl acetate), and optionally a surfactant. The binder system is mixed with a ceramic powder and heated to above the melting point of the binder. The heated mixture is formed into a compact having the general shape of the finished ceramic body and then cooled or allowed to cool. The hydrocarbon and copolymer have overlapping freezing points so that when the shaped compact cools, crystalline segments of the copolymer (such as ethylene segments) co-crystallize with the hydrocarbon, while amorphous segments (such as vinyl acetate) form bridges between the crystalline regions. As a result, the cooled compact has improved green strength over conventional binder systems.

26 Claims, 4 Drawing Sheets

U.S. PATENT DOCUMENTS

| | | |
|---|---|---|
| 5,746,976 A | 5/1998 | Kasai et al. |
| 5,772,949 A | 6/1998 | Haider et al. |
| 5,854,159 A | 12/1998 | Kato |
| 5,942,566 A | 8/1999 | Lombardi et al. |
| 5,972,286 A | 10/1999 | Lenk et al. |
| 6,004,503 A * | 12/1999 | Neil .......................... 264/632 |
| 6,005,037 A | 12/1999 | Scheckenbach et al. |
| 6,033,788 A | 3/2000 | Cawley et al. |
| 6,046,141 A | 4/2000 | Kurz et al. |
| 6,051,184 A | 4/2000 | Kankawa |
| 6,066,316 A | 5/2000 | Shiojima et al. |
| 6,126,887 A * | 10/2000 | Ward et al. |
| 6,126,889 A * | 10/2000 | Scott et al. .................. 264/632 |
| 6,315,941 B1 * | 11/2001 | Keller et al. |
| 6,346,495 B1 * | 2/2002 | Dynys et al. ............ 264/669 X |

\* cited by examiner

BINDER SYSTEM FOR CERAMIC ARC DISCHARGE LAMP

BACKGROUND OF THE INVENTION

1. Field of the Invention

The present invention relates generally to binder compositions for use in molding ceramic particulate compositions, and more particularly, to a binder system for forming arc tubes for ceramic arc discharge lamps.

2. Discussion of the Art

Discharge lamps produce light by ionizing a fill material, such as a mixture of metal halide and mercury, with an arc passing between the two electrodes. The electrodes and the fill material are sealed within a translucent or transparent discharge chamber, which maintains the pressure of the energized fill material and allows the emitted light to pass through. The fill material, also known as a "dose," emits a desired spectral energy distribution in response to being excited by the electric arc. For example, halides provide spectral energy distributions that offer a broad choice of light properties, including color temperatures, color rendering, and luminous efficiency.

Arc tube chambers composed of fused silica "quartz" are readily formed. However, the lifetime of such lamps is often limited by the loss of the metal portion of the metal halide fill (typically sodium) during lamp operation. Sodium ions diffuse through, or react with, the fused silica arc tube, resulting in a corresponding build-up of free halogen in the arc tube. Quartz arc tubes are relatively porous to sodium ions. During lamp operation, sodium passes from the hot plasma and through the arc tube wall to the cooler region between the arc tube and the outer jacket or envelope. The lost sodium is thus unavailable to the discharge and can no longer contribute its characteristic emission. The light output consequently diminishes and the color shifts from white toward blue. The arc becomes constricted and, particularly in a horizontally operated lamp, may bow against the arc tube wall and soften it. Also, loss of sodium causes the operating voltage of the lamp to increase and it may rise to the point where the arc can no longer be sustained, ending the life of the lamp.

Ceramic discharge lamp chambers were developed to operate at higher temperatures than quartz, i.e., above 950° C., for improved color temperature, color rendering, and luminous efficacies, while significantly reducing reaction with the fill material. U.S. Pat. Nos. 5,424,609; 5,698,984; and 5,751,111 provide examples of such arc tubes. While quartz arc tubes are limited to operating temperatures of around 950° C. to 1000° C., due to reaction of the halide fill with a gas, ceramic alumina arc tubes are able capable of withstanding operating temperatures of 1700° C. to 1900° C. The higher operating temperatures provide better color rendering and high lamp efficiencies. Ceramic arc tubes are less porous to sodium ions than quartz tubes and thus retain the metal within the lamp. Various techniques are available for fabricating the arc tubes, including casting, forging, machining, and various powder processing methods, such as powder injection molding (PIM). In powder processing, a ceramic powder, such as alumina, is supported by a carrier fluid, such as a water-based solution, mixture of organic liquids, or molten polymers. The mixture can be made to emulate a liquid, a plastic, or a rigid solid, by controlling the type and amount of carrier and the ambient conditions (e.g., temperature).

For forming relatively complex parts, such as arc tubes, it is common to mold sub-components and join them together after molding. The parts are extruded or dye pressed from a ceramic powder mixed with a carrier fluid comprising an organic binder. European Patent Application No. 0587238 A1, for example, discloses a ceramic discharge tube of translucent aluminum oxide. The result of the shaping process is a "green" (i.e., unfired) powdered compact that is a solid, but has an internal structure that consists of discreet powder particles held together by the action of the binder. The powder compact is converted to a dense solid through thermal processing or "sintering," which burns out or pyrolizes the organic phase and densifies or sinters the inorganic powder.

To form cohesive gas tight joints between the components, a joint compound, such as a polymer may be used, which seals the component parts together on fusing. By working in the green state, the joining operation can form a bond through action on the organic binder, rather than directly on the metal or ceramic. Alternatively, the component parts can be fused directly together. The joining operation is chosen to be compatible with subsequent thermal processing and not to interfere with densification In some cases the binder consists of a mixture of two or more materials. During binder removal, the process conditions are controlled, such that one component of the binder is preferentially removed while the other remains in the compact. At this intermediate stage, the powder compact develops porosity and becomes functionally equivalent to a compact of the type produced with a solvent-based system. Binder removal can be accomplished in several ways, including, for example, acid etching, solvent leaching, or thermal extraction. The removal process removes most, for example, 95% of the binder, prior to sintering, creating what is sometimes called a "brown" body. The residual binder in the brown body provides sufficient strength to the body to allow handling. The residual binder is eliminated after joining the component parts, during the initial stages of sintering.

The green or brown arc tube bodies are fragile, since the microstructure of the tube is not developed until sintering occurs. The small diameter legs of the arc tube end plugs, which carry the electrodes into the arc tube body, are particularly susceptible to breakage. Without extremely careful handling, a significant portion of the green or brown arc tubes can be wasted through breakage. Sometimes, the parts stick to the mold and break. The molds must then be opened and cleaned to remove broken parts. The parts can also be damaged during post-molding processes, such as machining.

Attempts have been made to improve the green strength of ceramic through modifications of the binder system. U.S. Pat. No. 5,332,537, for example, discloses chemically cross-linking a binder to increase the green strength. Such chemical cross-linking binders are typically superior in strength properties to paraffin-based binder systems. However, the chemically cross-linked systems cannot be recycled once the cross-linking process is complete. Moreover, chemical cross-linking can occur prematurely, i.e., during feedstock preparation. Furthermore, paraffin-based systems tend to have relatively low viscosity, which reduces contaminants picked up during processing. These contaminants can be detrimental to the optical properties of a ceramic arctube.

U.S. Pat. No. 4,734,237 discloses gelation in water based systems which provides physical cross-linking, to improve green strength.

U.S. Pat. No. 4,571,414 discloses a binder formulation comprising a blend of poly(ethylene-co-vinyl acetate) and an organic acid. The formulation has a relatively high viscosity. In order to create a flowable material, the binder is heated to an elevated temperature. U.S. Pat. No. 5,254,613 discloses a binder formulation comprising a blend of poly (ethylene-co-vinyl acetate) and two wax components with freezing points above 80° C.

The present invention provides a new and improved binder system and method of use, which overcomes the above-referenced problems, and others.

BRIEF SUMMARY OF THE INVENTION

In an exemplary embodiment of the present invention an injection moldable binder system for a sinterable powder is provided. The binder system includes a hydrocarbon and a copolymer which co-crystallizes with the hydrocarbon when the binder system is cooled.

In another exemplary embodiment, an injection moldable composition is provided. The composition includes a sinterable powder and a binder system. The binder system includes a hydrocarbon and a copolymer which co-crystallizes with the hydrocarbon when the binder system is cooled.

In another exemplary embodiment, a method of forming a ceramic body is provided. The method includes combining a binder system with a sinterable powder at a temperature above the melting point of the binder system. The binder system comprises a hydrocarbon and a copolymer. The binder system and the sinterable powder are formed into a shaped body. The hydrocarbon and the copolymer are selected such that segments of the copolymer co-crystallize with the hydrocarbon as the binder cools. The method further includes removing at least a major portion of the binder from the shaped body, and heating the shaped body at a sufficient temperature and for a sufficient time to form the ceramic body.

One advantage of the present invention is in improved green strength of molded ceramic components.

Another advantage of the present invention is that it enables unused binder to be recycled.

Another advantage of the present invention is that the binder may be processed at temperatures well below 100° C., enabling water heating to be used.

Another advantage is the current binder has a relatively low viscosity at temperatures below 100° C., which minimizes contamination due to abrasive wear and pick up of abraded particles.

Another advantage of the present invention is that the binder may be removed from a green ceramic body without producing significant defects, such as voids or cracks.

Still further advantages of the present invention will become apparent to those of ordinary skill in the art upon reading and understanding the following detailed description of the preferred embodiments.

DETAILED DESCRIPTION OF THE PREFERRED EMBODIMENT

Figure 1:
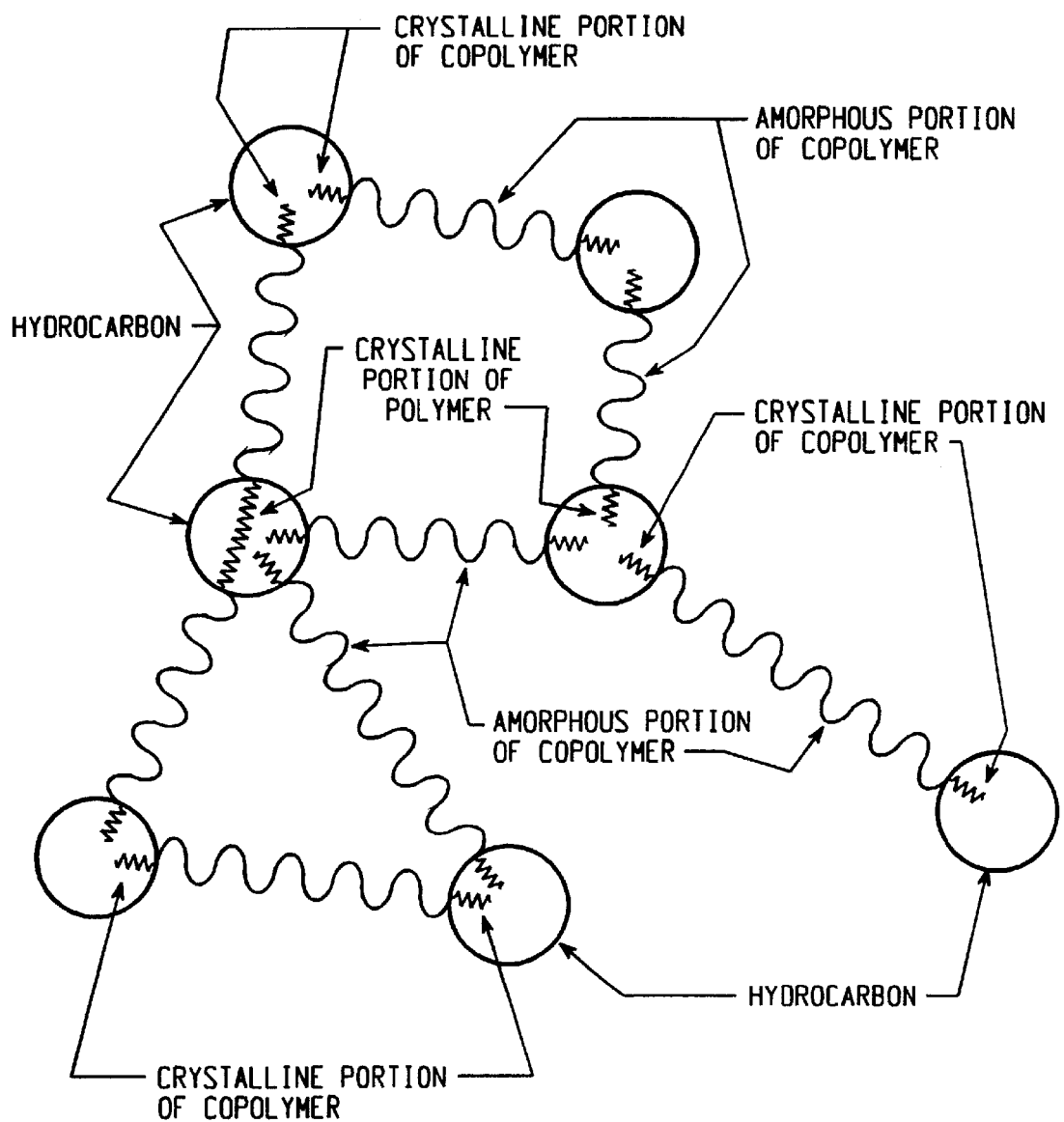
FIG. 1 is a schematic of a co-crystallized mixture of wax and poly(ethylene-co-vinyl acetate)

A binder system suitable for use in molding ceramic components is provided. While the binder system is described with particular reference to the formation of ceramic arc tubes, it will be appreciated that the binder is also applicable to molding of other ceramic components. The binder is mixed with a filler, such as a ceramic powder, and the mixture is formed into the desired shape. While particular reference is made to arctubes formed from an alumina-based ceramic powder, it will be appreciated that other sinterable materials and end products are also contemplated.

The low viscosity binder of the present invention provides enhanced green strength to ceramic injection-molded parts and inhibit contamination due to pickup of abraded materials, leading to enhanced optical properties. The binder preferably includes a low molecular, linear or branched hydrocarbon, such as a polyolefin, and a copolymer, such as polyethylene-co-vinyl acetate. Additionally, the binder may also include one or more surfactants and/or lubricants.

The binder system preferably comprises, by weight 70–90% hydrocarbon, 1–30% copolymer, and 0–20% surfactant. More preferably, the binder system comprises 80–90% polyolefin, 5–15% copolymer, and 2–10% surfactant. Most preferably, the binder system comprises about 85% polyolefin, about 10% copolymer, and about 5% surfactant.

The hydrocarbon and the copolymer are selected so as to have overlapping freezing point ranges and do not appreciably phase separate before freezing. By "overlapping freezing point ranges" it is meant that the freezing points of the wax and the copolymer are close enough to allow co-crystallization. Since most polyolefins and copolymers have a freezing point range, it is the peak freezing point, where most of the freezing occurs (the mode freezing point) which is considered. The freezing points are thus preferably within about 10° C., more preferably, within about 5° C. so that they crystallize at approximately the same temperature. Thus, if a higher freezing point copolymer is used, a comparably high freezing point hydrocarbon is also used. As a result, the copolymer co-crystallizes with the hydrocarbon, as well as forming bonds with hydrophilic units on the ceramic. Where the freezing points are more than about 15° C. apart, co-crystallization does not occur.

By co-crystallization, it is meant that at least some segments of the copolymer chains form regions of crystallinity with the hydrocarbon molecules when the composition is cooled.

The freezing point or freezing point range of a polymer or mixture of polymers can be measured by differential scanning calorimetry (DSC), using a calorimeter fitted with a means for cooling the polymer or mixture. While the melting point of a polymer or mixture differs from its freezing point in many instances, melting point can be used as an indicator of freezing point. Thus, two polymers with overlapping melting points will have similar freezing points. Melting point can also be measured by DSC, but using an instrument which allows a polymer or mixture to be heated to the melting point.

Macroscopic separation is undesirable because it prevents co-crystallization, leading to a reduction in mechanical strength. Cloud point studies can be used to determine compatibility. The cloud point is the point at which phase separation occurs due to one of the components separating and beginning to crystallize. A mixture of copolymer and wax is heated until the blend becomes clear, then the mixture is allowed to cool. The cloud point is the temperature at which a solution starts to cloud up, usually by forming white droplets. Where the cloud point differs widely from the freezing point of the other component, then co-crystallization does not occur. Rather, relatively large frozen droplets of one component are surrounded by the other component.

Exemplary hydrocarbons include synthetic waxes and natural waxes, such as polyolefin waxes, e.g., polymethylene wax, polyethylene wax, and polypropylene wax, paraffin wax, microcrystalline wax, oxidized waxes, crude montan wax, montan wax derivatives, carnauba wax, ouricury wax, candelilla wax, beeswax, wool wax, sugar cane wax, lignite wax, and Japan wax. These waxes preferably have a molecular weight of 200–2000, more preferably, from about 200–1000.

Paraffin and microcrystalline waxes are present in crude oil and are separated from the crude during refining. Paraffin waxes are straight chain hydrocarbons having a freezing point of from about 49 to about 71° C. Microcrystalline waxes are higher in molecular weight and more branched than paraffin waxes. They have freezing points of from about 60–89° C. Synthetic waxes tend to be low molecular weight polyethylenes or polymethylenes and melt at relatively higher temperatures.

For compatibility with ethylene/vinyl acetate copolymers having a vinyl acetate content of about 25–30% vinyl acetate, e.g., a composition containing 28% vinyl acetate, preferred hydrocarbons are paraffin waxes with a peak freezing point of about 60–70° C. and a viscosity of about 0.01–0.06 Pa s, more preferably, about 0.01–0.03 Pa s. One suitable paraffin wax is available from Allied Signal under the trade name ASTORWAX 4212, which has a freezing point of around 60° C.

With reference to FIG. 1, the copolymer preferably has at least some segments which are capable of co-crystallization with the hydrocarbon (crystalline portions) and at least some that are not co-crystallizable (amorphous portions). The crystalline portions are incorporated into the crystallites formed by the paraffin wax or similar hydrocarbon, the amorphous portions providing linking bridges between these regions. In the case of ethylene vinyl acetate copolymers, for example, the ethylene portion of the copolymer crystallizes with the paraffin and the amorphous, vinyl acetate portion remains free to form bridges between two paraffin segments, i.e., crystallization bridging, as shown in FIG. 1. The vinyl acetate portions are also attracted to the ceramic filler by dipolar interactions. Similarly, interactions occur between the organic acid (surfactant) and the acetate and between the organic acid and the alumina. Suitable copolymers include those with random, alternating, block, or star molecular structure. The crystalline and amorphous portions of the copolymer may thus comprise one or a number of monomer units.

Preferred copolymers are formed from a first monomer (A), which co-crystallizes and a second monomer (B) which does not. The molecular weight of the copolymer is preferably in the range of from about 3000 to about 5 million, with a preferred molecular weight of around 5000–15000.

Exemplary A monomers include copolymerizable unsaturated hydrocarbons, such as ethylene, propylene, isobutylene, 1-butene, conjugated dienes, such as butadiene; and epoxy group containing unsaturated monomers, such as epoxyalkenes, for example, ethylene oxide, propylene oxide, and the like. Preferred A monomers are ethylene, propylene, ethylene oxide, propylene oxide, and butylene.

Exemplary B monomers include vinyl monomers, such as vinyl acetate, vinyl alcohols; styrene monomers; and unsaturated carboxylic acids having from 2 to twenty carbon atoms, and their functional derivatives, such as alkyl acrylate esters, methacrylate esters, glycidal ester derivatives, anhydrides, amide and imide derivatives. Suitable unsaturated carboxylic acids include methacrylic acid, acrylic acid, fumaric acid and itaconic acid. Suitable acrylates include methacrylate, ethyl acrylate, propyl acrylate, isopropyl acrylate, methyl methacrylate, butyl acrylate, butyl methacrylate, glycidal methacrylate. Suitable alkyl (meth) acrylate esters include methyl methacrylate, ethylmethacrylate, n-butyl methacrylate, isobutyl methacrylate, 2-ethyl hexyl methacrylate, polypropyl methacrylate, polyisopropyl methacrylate. Suitable styrene monomers include styrene, α-methyl styrene, p-methyl styrene, p-tert-butyl styrene, 1,3-dimethyl styrene, vinyl toluene, and vinyl naphthalene. Suitable carboxylic acid anhydrides include maleic anhydride, citraconic anhydride, and itaconic anhydride. Suitable amides include methacylamide, acylamide, maleic mono and diamide. Suitable maleimides include maleimide, N-butylmaleimide, and N-phenylmaleimide.

Preferred B monomers include vinyl acetate, acrylic acids, acrylates, and styrene, vinyl acetate being particularly preferred.

The A and B monomers may also be dimers, trimers, or other low molecular weight polymers of such monomers, either alone or in combination.

Exemplary copolymers include ethylene/vinyl acetate copolymer (EVA), propylene/vinyl acetate copolymer, and ethylene/ethyl acrylate copolymer (EEA). Other copolymers include n-butylene/methacrylate, isobutylene/methacrylate, 2-ethylhexylene/methacrylate, propylene/methacrylate, isopropylene/methacrylate, ethylhexylene/methacrylate, n-dodecyl/methacrylate, ethylene/styrene, and polypropylene/styrene copolymers, and combinations thereof. Copolymers comprising more than one A or B monomer may be used, such as the Kraton™ series available from Shell which comprise ethylene-propylene/styrene copolymers.

In one embodiment, the copolymer is an ABA triblock copolymer, comprising crystalline end blocks formed from A monomers and an amorphous midblock formed from B monomers. The two A end blocks can be formed from the same monomer or from different monomers. Each of the A and B blocks may be interpolymer blocks (i.e., formed from different monomers, e.g., two or more different A monomers) or homopolymer blocks (formed from a single monomer). In another embodiment, the copolymer is an AB diblock copolymer, with A and B blocks as previously described. Copolymers comprising more than one A monomer include the Kraton™ series available from Shell which comprise ethylenepropylene/styrene copolymers. BAB copolymers are also contemplated, in which two amorphous end blocks are separated by a crystalline midblock. Multi-block copolymers having four or more blocks may also be used.

The blocks preferably have a molecular weight of from 500–500,000, more preferably, from about 20,000 to 50,000.

Copolymers of vinyl acetate and copolymerizable unsaturated hydrocarbons are preferred. EVA is a particularly preferred copolymer. The polar groups provided by the vinyl acetate component are attracted to polar ceramic fillers, such as alumina, while the ethylene segments co-crystallize with the wax. Suitable vinyl acetate copolymers include 9–33% vinyl acetate. As the vinyl acetate content increases, the freezing point of the copolymer decreases. For compatibility with paraffin waxes, the copolymer is preferably 18–33% vinyl acetate, and most preferably about 28% vinyl acetate.

Suitable ethylene/vinyl acetate copolymers are random copolymers sold under the tradename Elvax by E.I. Du Pont de Nemours, & Co. Elvax 460, for example, comprises 18% vinyl acetate and has a melting point of 87° C. The freezing point of the copolymer ranges from 40–80° C., with most of the freezing occurring at 66° C. The polymer freezes at the same temperature as a 150MP Paraffin wax, and thus these two components are particularly compatible. Elvax 210 comprises 28% vinyl acetate and has a freezing point of 60° C. This is compatible with a paraffin wax such as ASTOR-WAX 4212, which has a freezing point of around 60° C.

For microcrystalline waxes, such as Microwax 783, available from Conoco, which has a melting point of about 79° C., and a higher freezing point than paraffin wax, ethylene/vinyl acetate copolymers with lower vinyl acetate contents are preferred, such as those having a vinyl acetate content of from about 9–15%. A 9% vinyl acetate Elvax copolymer is available with a melting point of about 100° C. and a freezing point of about 80° C.

In a preferred embodiment, both the polyolefin and the copolymer have freezing points in the range of 50–90° C., more preferably, from 60–70° C. For compatibility, particularly preferred polyolefins have a density of from about 0.9 to about 0.91 g/cm$^3$, a molecular weight of 200–1000, and a viscosity of from about 0.01 to about 0.03 Pa.s, and copolymers a preferred density of from about 0.92 to about 0.96 g/cm$^3$, a molecular weight of from about 5000 to about 15,000, and a viscosity of from about 500–1500 Pa.s.

It will be appreciated, however, that compatible compositions outside these ranges may be obtained provided that the properties of the polyolefin and copolymer are reduced or increased concomitantly.

The surfactant improves the miscibility of the other components and improves the flowability of the binder/powder composition being shaped. Lubricants serve similar functions and may also act as release agents, to improve release of the shaped article from the mold. Suitable surfactants/lubricants include organic acids, such as higher fatty acids/alcohols/esters which contain from about 10–30 carbon atoms per molecule and have a freezing point ranging from about 44° C. to 88° C. Organic acids compatibilize the powder with the binder and allow the binder to be thermally decomposed during heating in a reasonable time, without sacrificing the beneficial molding properties of the copolymers. The organic acid or other surfactant/lubricant is preferably present in the binder composition at a concentration at about 0–20 weight %, more preferably, not more than 10% and most preferably, about 5 weight % of the binder composition.

Exemplary higher fatty acids include stearic acid, maleic acid, lauric acid, cerotic acid, myristic acid, palmitic acid, baltimoic acid, isosteric acid, arachidic acid, behenic acid, oleic acid, linoleic acid, and combinations of two or more thereof. Preferred organic acids are fatty acids, such as stearic acid (melting point about 70° C.), maleic acid (melting point about 139° C.), lauric acid (melting point about 44° C.) cerotic acid (melting point about 88° C.), and mixtures thereof. A particularly preferred organic acid is stearic acid. Exemplary alcohols include oleyl alcohol.

Other exemplary surfactants/lubricants include esters of dicarboxylic acids (e.g., phthalic acid,succinic acid, alkyl succinic acids, and alkenyl succinic acids, maleic acid, azelaic acid, suberic acid, sebasic acid, fumaric acid, adipic acid, linoleic acid dimer, malonic acid, alkyl malonic acids, alkenyl malonic acids) with a variety of alcohols ( e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di-2-ethyhexyl adipate, didecyl adipate, diisodecyl adipate, octyldecyl adipate, dibutyl sebacate, di(2-ethylhexyl)sebacate, butyl benzyl sebacate di-n-hexyl fumarate, dioctyl sebacate, diisooctyl azelate, diisodecyl azelate, diethyl phthalate, dibutyl phthalate, dioctyl phthalate, didecyl phthalate, diecosyl sebacate, dibutyl maleate, di-2-ethylhexyl maleate, dibutyl fumarate, the 2-ethylhexyl diester of linoleic acid dimer, and the complex ester formed by reacting one mole of tetraethylene glycol with two moles of 2-ethylhexanoic acid.

Dioctyl phthalate and diethyl phthalate are particularly preferred esters acting as lubricants.

Exemplary alcohols include higher alcohols, such as oleyl alcohol, cetyl alcohol, lauryl alcohol, ceryl alcohol, myristyl alcohol, and stearyl alcohol, oleyl alcohol being particularly preferred.

Block copolymer surfactants may also be used, such as polyethylene-block-poly(ethylene glycol), poly(ethylene-co-vinyl acetate)-graft-maleic anhydride.

One or more of such surfactants/lubricants can be used in the composition.

The binder may also include other ingredients, such as mold releases, antioxidants, supplemental fillers, and the like commonly used in binder formulations.

The powder is a densifiable powder; i.e., it can be densified to produce a crystalline ceramic body. The binder system is applicable to any sinterable powder or combination of powders, including metal powders, ceramic powders, and cermet powders. For arc tube applications, ceramic powders are preferred. For such applications, the ceramic powder is preferably a particulate ceramic material, which, when formed into the baked body, can be densified without the application of mechanical pressure to produce a polycrystalline ceramic body having a porosity of less than about 20% by volume. Examples of such densification of the present baked body includes sintering or firing the baked body in a vacuum gaseous atmosphere, reaction bonding of the baked body and/or hot isostatic pressing of the baked body with a gas.

Exemplary ceramic powders include oxides, such as oxides of aluminum, silicon, zirconium, titanium, beryllium, magnesium, yttrium, niobium, tantalum, molybdenum, manganese, tungsten, vanadium, technetium, rhenium, cobalt, nickel, ruthenium, rhodium, cadmium, thallium, germanium, tin, lead, antimony, bismuth, tellurium, indium, barium, gallium, calcium, strontium, lanthanum, selenium, scandium, actinium, thorium, hafnium, chromium, palladium, osmium, zinc, and iron; titanates, such as those of barium, lead, magnesium, manganese, iron, cobalt, and nickel; carbides, such as those of silicon, boron, aluminum, tungsten, titanium, zirconium, hafnium, molybdenum, tantalum, chromium, and vanadium; zirconates, such as those of lead, and strontium; nitrides, such as those of silicon, aluminum, boron, and titanium; borides, such as those of titanium, zirconium, and lanthanum; sulfides, such as cadmium sulfide and zinc sulfide; silicides, such as molybdenum silicide and sialon, and carbonates, such as calcium carbonate. The ceramic powder may be a combination of two or more sinterable powders.

Exemplary metal powders, to name only a few, include powders of iron, copper, titanium, tungsten, nickel, molybdenum, chromium, zinc, aluminum, zirconium, beryllium, germanium, cobalt, silicon, scandium, and vanadium, alloys thereof, and mixtures thereof. Non-metal sinterable powders, such as boron, carbon, and tetrahedral carbon are also contemplated.

Exemplary cermet powders include powders of alloys of mixtures of the above mentioned ceramics and metals.

For arc tube formulations, the densifiable powder is preferably a ceramic powder which becomes translucent during sintering, such as a sinterable alumina, zirconia, silicone carbide, silicon nitride, mullite, yttrium-aluminum garnet (YAG), spinels, such as $MgAl_2O_4$, or aluminum nitride powder, which may be used alone or in combination with one or more sintering additives. For arc tube formulations, for example, a suitable sinterable alumina-based powder may contain a sintering additive in addition to alumina. One particularly useful sintering additive is MgO. A sinterable silicon carbide-based powder comprises silicon carbide and a suitable sintering additive, such as a combination of boron and free carbon. A sinterable silicon nitride-based powder comprises, for example, silicon nitride and a suitable sintering additive, such as MgO. A sinterable mullite-based powder powder may or may not contain sintering additive. A sinterable aluminum nitride-based powder comprises, for example, aluminum nitride and a suitable sintering additive such as $Y_2O_3$ or CaO Generally, a sinterable ceramic powder contains sintering additive up to about 5% by weight of the powder.

The sinterable powder preferably has an average particle size of from 0.01–1000 $\mu$m, more preferably, below about 50 $\mu$m. For arc tube applications, the average size of the ceramic powder preferably ranges up to about 10 $\mu$m and depends largely on the particular densification technique employed, i.e., larger particle sizes can be used in reaction bonding whereas smaller particle sizes would be used in sintering a compact thereof Preferably, however, the ceramic powder has an average particle size which is submicron and most preferably, it has an average particle size ranging from about 0.05 microns up to about 1 micron.

The binder is intimately mixed with the ceramic powder in a ratio that maintains the thermoplastic behavior of the binder but contains enough powder to form a self-supporting powder compact free of significant defects once the binder is removed. Specifically, the thermoplastically moldable ceramic composition comprises from about 60% by weight to about 95% by weight, more preferably, about 70–90% by weight, and most preferably, about 85% by weight, of solids, i.e., the ceramic powder composition, and the balance is the binder.

The ceramic powder and the present binder can be admixed by a number of conventional techniques, such as kneading, to produce the moldable ceramic composition. Preferably, the ceramic powder and the binder are mixed at temperature at which the binder system is molten, preferably at temperatures ranging from about 60° C. to about 180° C. Once mixed, the resulting binder ceramic powder composition can be solidified. The binder/ceramic mixture is comminuted to free-flowing granules, for example, by extrusion, to produce a more useful feed material, as needed.

The binder is typically mixed with heat to the above the freezing point of the components and then the alumina and/or other ceramic powder is added. The binder formulation can thus be stored as a solid until needed, it is then granulated and melted prior to injection molding or other shaping. The binder composition provides greater strength which improves safe ejection from the mold without cracking and allows post-processing, such as machining.

A number of thermoplastic molding techniques can be used to produce the present molded body. Representative of such techniques are pressure injection molding, gas-assisted injection molding, extrusion molding, blow molding, compression molding, transfer molding, drawing and rolling.

To carry out the thermoplastic molding, sufficient heat and pressure is applied to the ceramic composition to force it to flow to the desired degree depending on the particular thermoplastic molding process employed. The ceramic powder/binder composition is heated to a temperature at which the binder is soft or molten depending upon the particular thermoplastic molding process. For most commercial thermoplastic forming techniques, the present ceramic composition is heated to make the binder molten at from about 60° C. to about 200° C., shaped under a pressure ranging from about 5 psi to about 30,000 psi, depending upon the particular thermoplastic forming technique, and then allowed to cool and harden. For example, in the case of injection molding, the molten ceramic composition is forced into a die to produce the molded product. Specifically, for injection molding, the molten ceramic mixture, preferably at a temperature from about 65° C. to about 90° C. and under a pressure ranging from about 1000 psi to about 30,000 psi, is forced into a die where it is allowed to harden and then removed from the die. The die may be cooled to facilitate hardening.

At this stage, shaping, or other post-molding processing may be carried out.

The binder is removed from the green ceramic prior to sintering. Methods of removal include solvent leaching, for example, a hexane solvent is used to remove the binder; baking to evaporate and/or pyrolize the wax and copolymer; and wicking. In a baking process, the molded green ceramic component may be embedded in a supporting powder, such as charcoal, which prevents significant distortion of the powder during baking, and heated to a sufficient temperature to remove the binder, such as about 200–450° C. Baking may be carried out under a vacuum or in an atmosphere, which has no significantly deleterious effect thereon. For example, an atmosphere enriched with oxygen may be used to evaporate, degrade and/or pyrolyze the wax and other organic components.

Solvent extraction, for example, may be carried out by immersing the molded body in a solvent for sufficient time and at a suitable temperature (e.g., 2–6 hours at about 50° C.) to remove the binder. Binders based on ethylene/vinyl acetate copolymer and paraffin wax can be solvent leached with hexane.

A combination of these processes may be used. For example, solvent extraction may be used to remove alcohol components of the binder, followed by baking to remove the remainder of the binder components. Preferably, for arc tube applications, all, or substantially all the binder is removed before firing (i.e., leaving no amount of binder which would have a significantly deleterious effect on the body or on the resulting densified body.

At this stage, subcomponents of a complex ceramic body may be adhesively tacked together or otherwise joined. Or, the components may be joined prior to binder removal, or at some other stage in the process.

A number of densification processes may be used for converting the green/brown ceramic body into a densified, polycrystalline body. Exemplary densification techniques include firing or sintering, hot isostatic pressing, and reaction bonding densification.

Firing or sintering of the present baked body of sinterable ceramic powder is carried out at an elevated temperature in a vacuum or gas which has no significant deleterious effect thereon to produce a polycrystalline body.

To carry out hot isostatic pressing, the baked body is treated to make it gas impermeable and then hot isostatically pressed with a gas at superatmospheric pressure and at an elevated temperature which has no significantly deleterious effect on it, to produce a polycrystalline body having a porosity of generally less than 20% by volume. The particular gas pressure depends largely on the density desired in the final product, and the particular temperature depends largely on the composition of the body and should have no significant deleterious effect thereon. Generally, isostatic pressing is carried out at a pressure ranging from about 1000 psi to about 30,000 psi at a temperature ranging from about 1400° C. to about 2200° C. The hot isostatic pressing gas should have no significant deleterious effect on the body. Examples of useful inert gases are argon, helium, nitrogen, and mixtures thereof.

The baked body can be treated to make it gas impermeable by a number of techniques, depending largely on the composition. For example, the baked body may be fired in oxygen at from about 1000–1675° C. to close off its pores prior to hot isostatic pressing. This "partial sintering" stage can also be used to join the component parts of a finished body together, such as the components of a ceramic arc tube.

Generally, reaction bonding comprises contracting the present shaped baked body at an elevated temperature with a liquid or gas with which it reacts thereby densifying and producing the present polycrystalline body.

The binder removal and sintering processes may be carried out in separate furnace or in a single furnace. However, because of the relatively large temperature differences, they are preferably carried out in separate furnaces.

Figure 2:
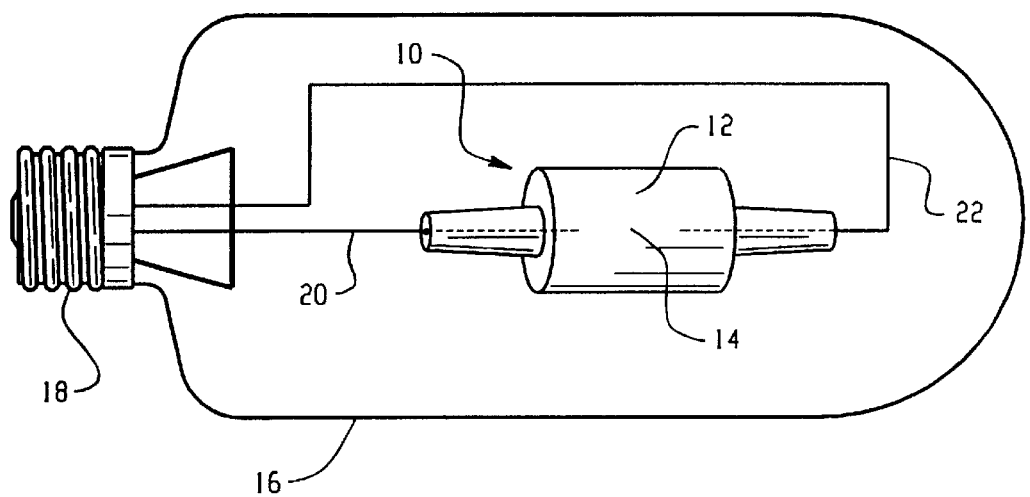
FIG. 2 is a perspective view of a lamp according to the present invention.

By way of example an alumina ceramic arc tube body and method of preparation will be described, although it will be appreciated that the binder may be used to provide other polycrystalline bodies. With reference to FIG. 2, a high-pressure metal halide lamp is provided with a discharge vessel 10, including a high-transmission arc tube or body 12 which encloses a chamber or discharge space 14.

The discharge space preferably contains a fill which comprises at least one metal halide, such as sodium iodide, tantalum iodide or dysprosium iodide, in addition to mercury and a rare gas, such as Argon or Xenon. Other suitable fills, for initiating and sustaining an arc discharge, known in the art, are also contemplated. The discharge vessel is enclosed in an outer envelope 16, which is provided with a lamp cap 18 at one end.

First and second internal electrodes 20, 22 extend into the discharge space 12. The electrodes are formed from tungsten, or other known electrode material. A discharge forms between the electrodes when the lamp is in an operational state. The electrodes are electrically connected with first and second electrical contact forming parts of the cap 18.

The ceramic arc tube 12 includes a cylindrical portion 30 and end plugs 34, 36. The end plugs each include a disk portion 38, 40, from which a hollow leg portion or tube 42, 44, extends outwardly therefrom. The electrodes 20, 22 are received by the first and second leg portions. The electrodes are sealed into the leg portions with seals to create a gas-tight discharge space.

The cylindrical portion and end portions are preferably all formed from a polycrystalline aluminum oxide ceramic, although other polycrystalline ceramic materials capable of withstanding high wall temperatures up to 1700–1900° C. and resistant to attack by the fill materials are also contemplated.

Figure 3:
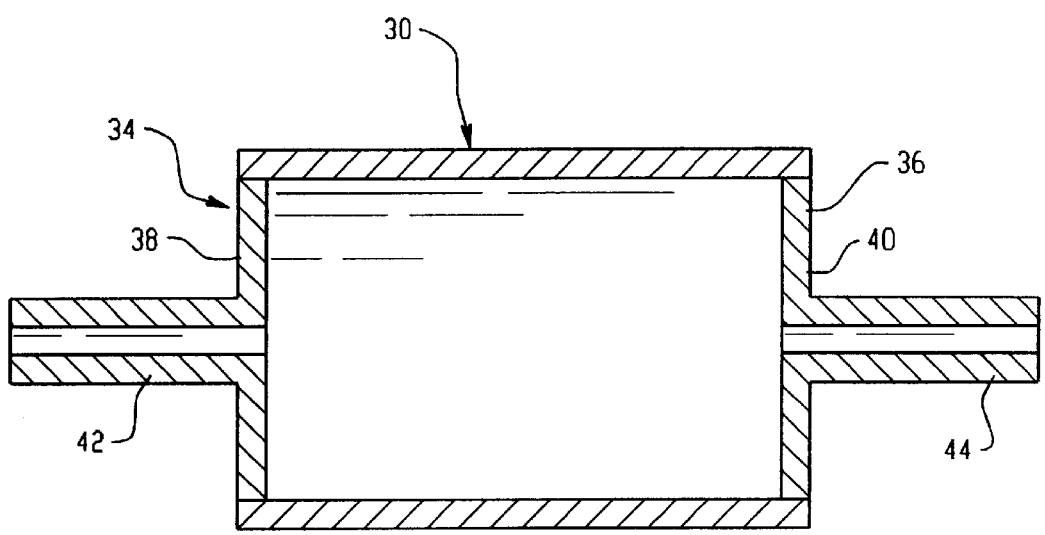
FIG. 3 is a schematic side view of the arc tube of FIG. 2.

The arc tube 12 is readily assembled from separate components. In the arc tube of FIGS. 2 and 3, there are three components, the two end plugs, 34, 36 and the cylindrical portion 30, although fewer or greater numbers of components may be employed. The components are fabricated, for example, by die pressing or extruding a mixture of the ceramic powder and the binder system. The binder is then removed, for example, by solvent leaching with hexane, and/or by heating the arc tube to a temperature of about 200–400° C. to oxidize and burn out the wax and copolymer as a vapor. Assembly of the arc tube involves placement and tacking of the extruded components, followed by partial sintering. For example, the first and second tubes may be tacked to respective end portions of the cylinder with adhesive and the end portions are tacked to the cylindrical portion. The tacked components are then partially sintered at a temperature of around 1100° C. to form gas-tight joints. During this partial sintering, the components shrink slightly. The shrinkage is used advantageously in forming the gas-tight joints. Alternatively, the components may be partially sintered to a temperature of below about 1000° C. (disk firing), prior to assembly of the components.

Alternatively, arc tubes may be formed as a single piece by gas-assisted injection molding techniques.

The partially sintered (or "green ceramic") arc tube preferably has an alumina content of about 99.99%, with magnesia (MgO) present at up to 0.5 weight percent, preferably at about 400–1500 ppm. The magnesia imparts transparency to the finished tube.

To form a high-transmittance arc tube, the partially sintered arc tube may be subjected to heating in an inert atmosphere at a temperature of 1600 to 1900° C. for a period of from about one to about three hours. Pressures above atmospheric may also be applied. Argon gas provides a suitable inert atmosphere, although other inert gases are also contemplated. The partially sintered ceramic is converted from an opaque material to a translucent polycrystalline aluminum oxide. The sintering step also strengthens the joints between the components of the arc tube. Other sintering methods are also contemplated.

Without intending to limit the scope of the present invention the following examples compare the properties of the present binder with a binder of similar viscosity.

EXAMPLES

Example 1

Figure 4:
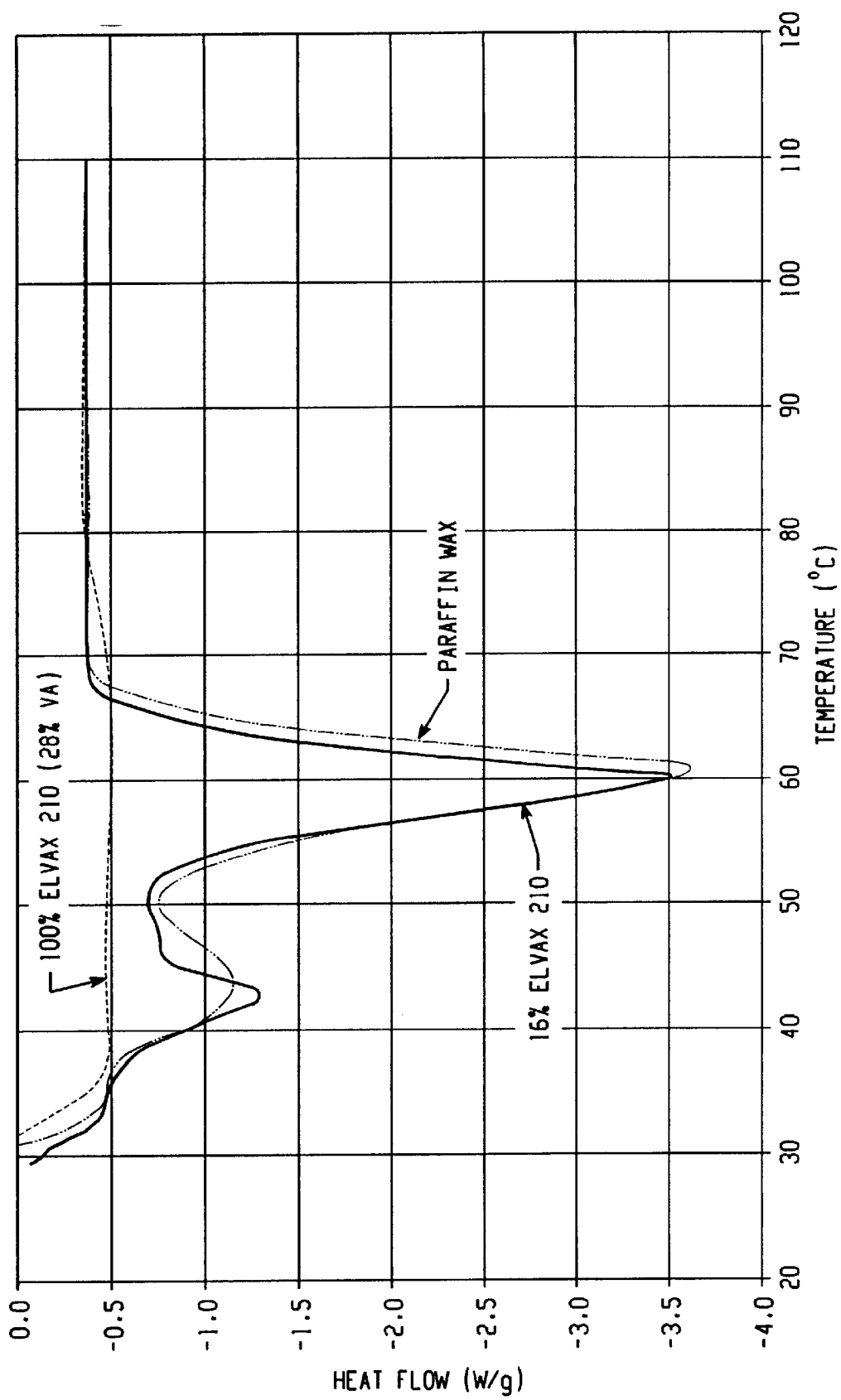
FIG. 4 shows differential calorimetry (DSC) scans for a paraffin wax, a vinyl acetate copolymer, and a mixture thereof.

Differential scanning calorimetry (DSC) curves for paraffin EVA blends were obtained to determine compatible copolymers and polyolefins. FIG. 4 shows DSC curves for 100% paraffin wax (ASTORWAX 4212), 100% ethylene/vinyl acetate copolymer (Elvax 210—28% vinyl acetate), and a mixture of 16% Elvax 210, balance paraffin wax. As can be seen, the two components have overlapping melting points.

Example 2

End plugs for a CMH arc tube according to FIG. 2 were prepared by pressure injection molding a mixture of 15 wt % of a binder system and 85 wt % alumina powder. The binder comprised 85.5 wt % poleolefin (ASTORWAX 4212), 9.5 wt % poly(ethylene-co-vinyl acetate) copolymer obtained DuPont under the tradename Elvax 210, and 5% sufactant-stearic acid, obtained from Aldrich.

The binder had a viscosity of about 0.05 Pa.s at 70° C.

Similar arc tube components were prepared with a conventional low viscosity binder comprising paraffin wax, a higher MW hydrocarbon, and stearic acid as its major components, with a viscosity of 0.03 Pa.s at 70° C. It should be noted that the melting point of the wax and hydrocarbon were not overlapping. Both the strength and modulus of the present binder were higher than that of the conventional binder, while the viscosity and processing temperature were similar.

Figure 5:
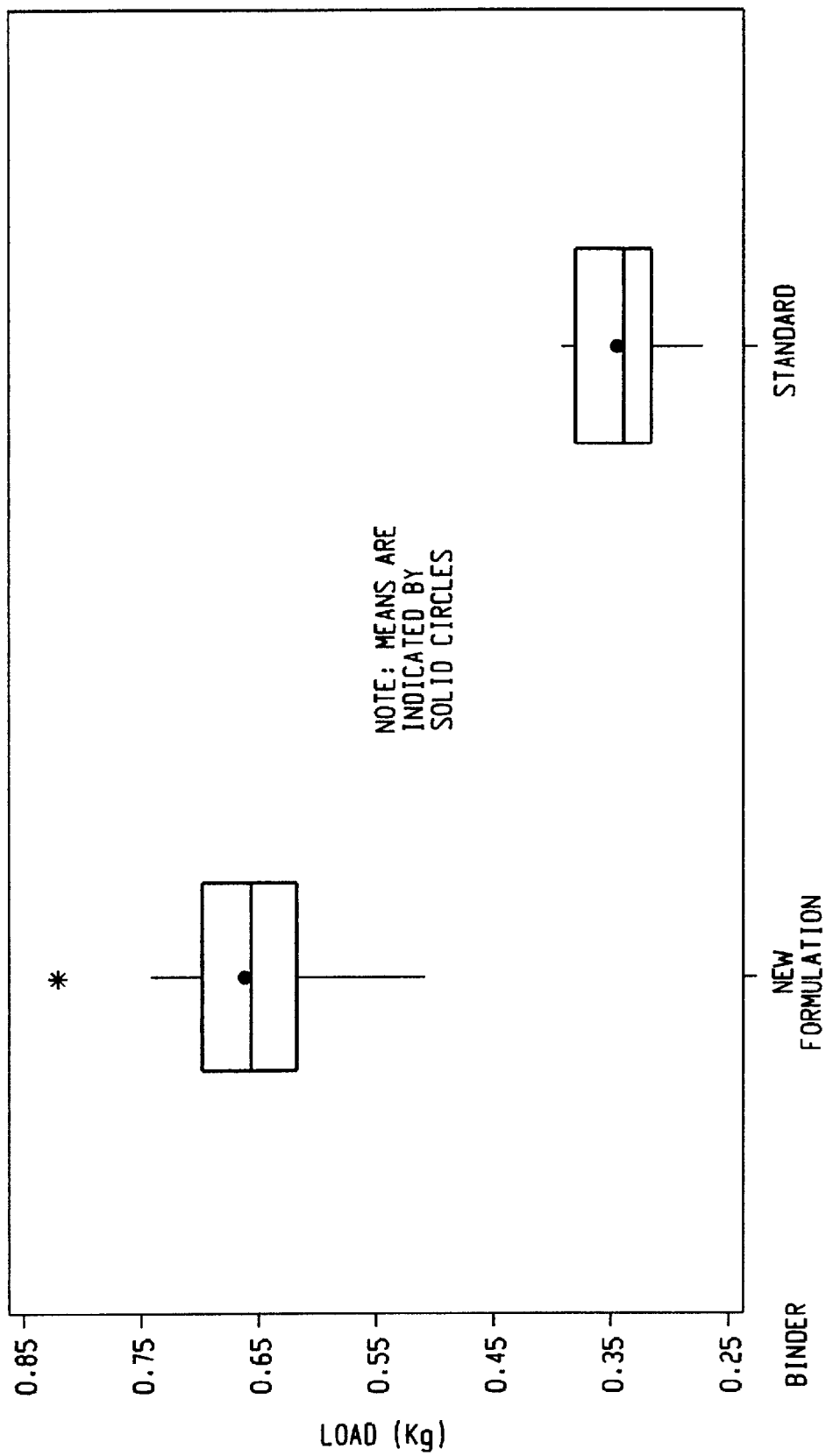
FIG. 5 is a box plot showing the load in Kg required to break legs off a ceramic arc tube in the green state for a standard binder and a binder according to the present invention.

An Instron mechanical testing device set up in cantilever geometry was used to determine the load required to break the legs off the injection molded parts in the green state (prior to binder removal). FIG. 5 shows a box plot of the load required. As shown in FIG. 4, the load required with the new binder was higher. The injection molded parts with the present binder exhibited approximately 100% greater strength compared to prior binders. Both samples were molded at the same injection speeds and pressure.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of forming a ceramic body comprising:
   a) combining a binder system with a sinterable powder at a temperature above the melting point of the binder system, the binder system comprising:
      a hydrocarbon, and
      a copolymer;
   b) forming the binder system and the sinterable powder into a shaped body, all hydrocarbons and copolymers in the binder system having freezing points which are within about 5 degrees such that the hydrocarbons and copolymer in the binder system co-crystallize as the binder system cools;
   c) removing at least a major portion of the binder system from the shaped body; and
   d) heating the shaped body at a sufficient temperature and for a sufficient time to form the ceramic body.

2. The method of claim 1, wherein the ceramic body is a portion of an arctube, the method further including:
   joining the ceramic body with other portions of the arctube to form an arctube; and
   sintering the arctube to form a translucent arctube.

3. The method of claim 1, wherein the hydrocarbon is selected from the group consisting of polyolefin waxes, paraffin wax, microcrystalline wax, oxidize waxes, crude montan wax, montan wax derivatives, carnauba wax, ouricury wax, candelilla wax, beeswax, wool wax, sugar cane wax, lignite wax, Japan wax, and combinations thereof.

4. The method of claim 1, wherein the hydrocarbon has a weight average molecular weight of from about 200–2000.

5. The method of claim 1, wherein the copolymer includes mer units of a first monomer and a second monomer, the first monomer providing the copolymer with crystalline regions, the second monomer providing the copolymer with amorphous regions.

6. The method of claim 5, wherein the first monomer is selected from the group consisting of copolymerizable unsaturated hydrocarbons, conjugated dienes, epoxy group containing unsaturated monomers, and combinations thereof.

7. The method of claim 6, wherein the first monomer is selected from the group consisting of ethylene, propylene, butylene, ethylene oxide, propylene oxide, and combinations thereof.

8. The method of claim 5, wherein the second monomer is selected from the group consisting of vinyl monomers, styrene monomers, unsaturated carboxylic acids having from 2 to twenty carbon atoms, and their functional derivatives, and combinations thereof.

9. The method of claim 8, wherein the second monomer is selected from the group consisting of vinyl acetate, vinyl alcohols, carboxylic acids, methacrylates, alkyl acrylates, methacrylate esters, alkyl acrylate esters, glycidal ester derivatives, anhydrides, amides, imides, and combinations thereof.

10. The method of claim 5, wherein the first monomer includes ethylene and the second monomer includes vinyl acetate.

11. The method of claim 10, wherein the hydrocarbon is a paraffin wax having a freezing point of about 60° C. and the copolymer includes about 25–30% vinyl acetate.

12. The method of claim 1, wherein the binder system comprises, by weight:
   70–90% hydrocarbon;
   1–30% copolymer; and
   0–20% surfactant.

13. The method of claim 1, where the binder system comprises, by weight:
   80–90% polyolefin,
   5–15% copolymer, and
   2–10% surfactant.

14. The method of claim 12, wherein the surfactant includes stearic acid.

15. A method of forming a ceramic body comprising:
   a) combining a binder system with a sinterable powder at a temperature above the melting point of the binder system, the binder system comprising:
      80–90% polyolefin,
      2–15% copolymer, and
      2–10% surfactant;
   b) forming the binder system and the sinterable powder into a shaped body, the polyolefin and the copolymer selected such that the copolymer co-crystallizes with the polyolefin as the binder system cools;
   c) removing at least a major portion of the binder system from the shaped body; and
   d) heating the shaped body at a sufficient temperature and for a sufficient time to form the ceramic body.

16. The method of claim 15, wherein the hydrocarbon and the copolymer have overlapping freezing points.

17. The method of claim 15, wherein the hydrocarbon and the copolymer have peak freezing points which differ by no more than 10° C.

18. The method of claim 15, wherein the ceramic body is a portion of an arctube, the method further including:
   joining the ceramic body with other portions of the arctube to form an arctube; and
   sintering the arctube to form a translucent arctube.

19. The method of claim 15, wherein the copolymer includes mer units of a first monomer and a second monomer, the first monomer providing the copolymer with crystalline regions, the second monomer providing the copolymer with amorphous regions.

20. The method of claim 19, wherein the first monomer is selected from the group consisting of copolymerizable unsaturated hydrocarbons, conjugated dienes, epoxy group containing unsaturated monomers, and combinations thereof.

21. The method of claim 20, wherein the first monomer is selected from the group consisting of ethylene, propylene, butylene, ethylene oxide, propylene oxide, and combinations thereof.

22. The method of claim 19, wherein the second monomer is selected from the group consisting of vinyl monomers, styrene monomers, unsaturated carboxylic acids having from two to twenty carbon atoms, and their functional derivatives, and combinations thereof.

23. The method of claim 22, wherein the second monomer is selected from the group consisting of vinyl acetate, vinyl alcohols, carboxylic acids, methacrylates, alkyl acrylates, methacrylate esters, alkyl acrylate esters, glycidal ester derivatives, anhydrides, amides, imides, and combinations thereof.

24. The method of claim 19, wherein the first monomer includes ethylene and the second monomer includes vinyl acetate.

25. The method of claim 24, wherein the polyolefin is a paraffin wax having a freezing point of about 60° C. and the copolymer includes about 25–30% vinyl acetate.

26. The method of claim 15, wherein the surfactant includes stearic acid.

* * * * *